United States Patent [19]

Brown

[11] 3,976,177

[45] Aug. 24, 1976

[54] TWO-LOBED CONVEYOR BALLS

[75] Inventor: Elwood B. Brown, Cedarburg, Wis.

[73] Assignee: Rexnord Inc., Milwaukee, Wis.

[22] Filed: Feb. 25, 1975

[21] Appl. No.: 552,816

[52] U.S. Cl. .............................. 193/37; 193/35 MD
[51] Int. Cl.² ......................................... B65G 39/02
[58] Field of Search ............. 193/35 MD, 37, 35 R, 193/36; 198/127 R, 105

[56] References Cited
UNITED STATES PATENTS

| | | | |
|---|---|---|---|
| 925,928 | 6/1909 | Lueke | 193/37 X |
| 2,717,071 | 9/1955 | Cook | 193/35 R X |
| 3,621,961 | 11/1971 | Stumpf | 193/37 |
| 3,679,043 | 7/1972 | Becker | 193/35 MD X |
| 3,874,491 | 4/1975 | Faure | 193/35 MD |

OTHER PUBLICATIONS

*Transwheel Bulletin,* 2003, Kornylak Corporation, 400 Heaton St., Hamilton, Ohio, 45011, July, 1970, pp. 1–8.

Primary Examiner—Evon C. Blunk
Assistant Examiner—James L. Rowland
Attorney, Agent, or Firm—Sughrue, Rothwell, Mion, Zinn & Macpeak

[57] ABSTRACT

The specification discloses a two-lobed conveyor ball comprising a hub having a hole therethrough adapted to receive a first axle, second and third axles coaxially mounted on the hub at right angles to the axis of the hole therein and on opposite sides thereof, first and second generally hemispherical lobes rotatably mounted on the second and third axles respectively, and a spacer disc mounted on the hub, extending between the second and third generally hemispherical lobes, and filling the gap therebetween at the outer surface thereof, thereby preventing objects or material being passed over the conveyor ball during use thereof from getting caught between the first and second generally hemispherical lobes.

26 Claims, 8 Drawing Figures

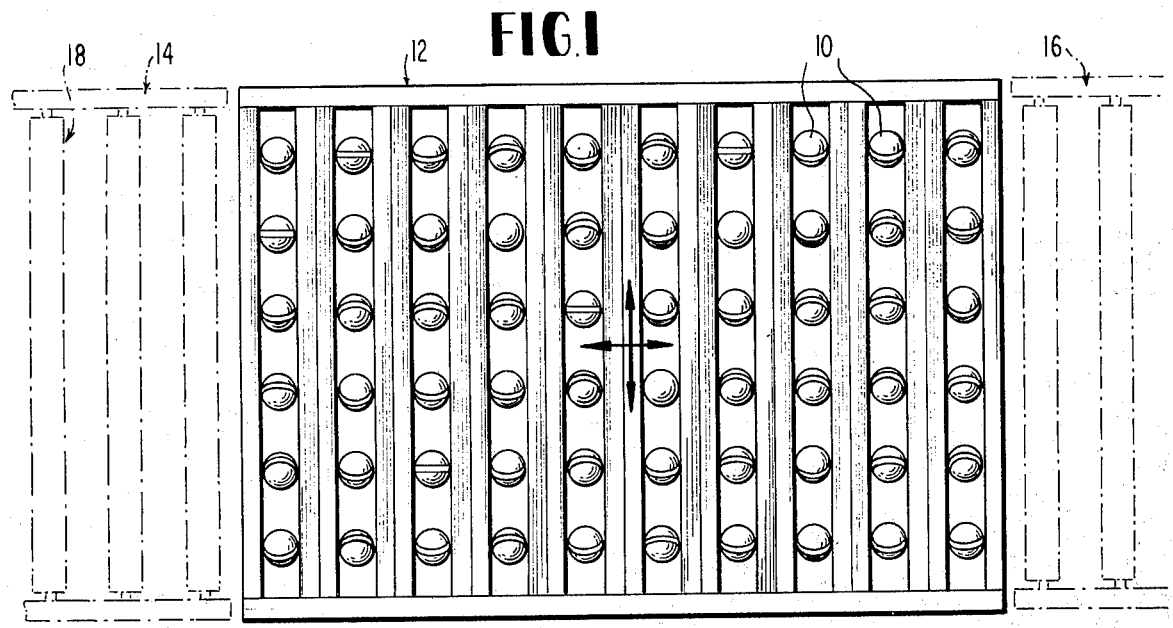
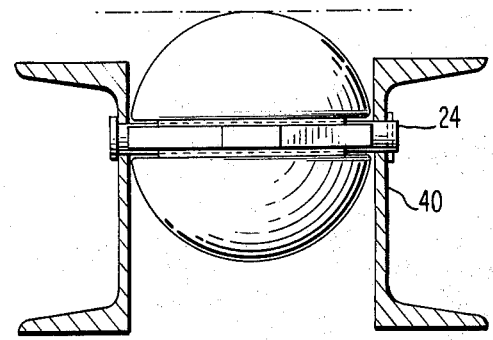
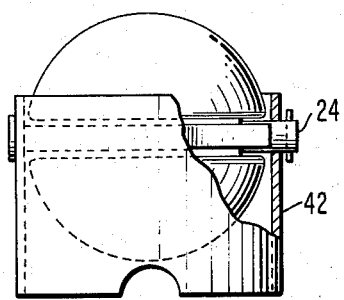
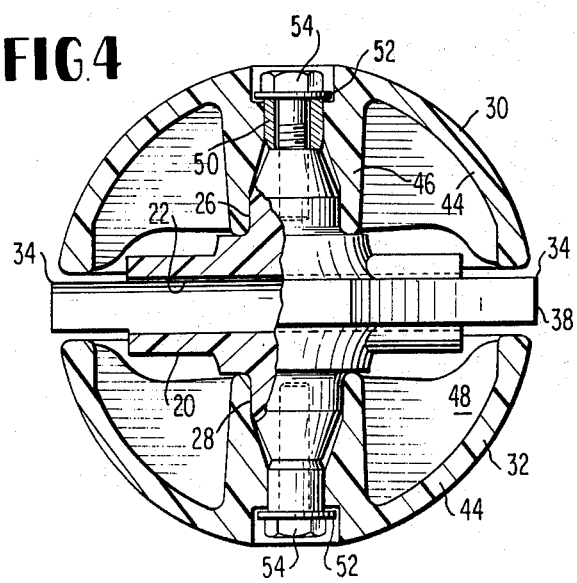
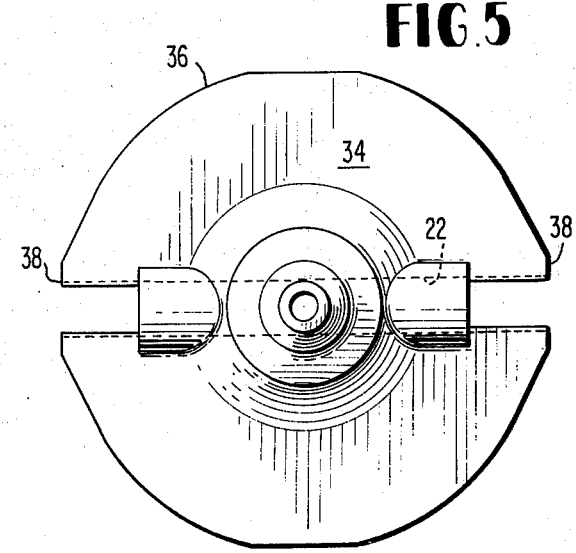

TWO-LOBED CONVEYOR BALLS

FIELD OF THE INVENTION

This invention relates to conveyor apparatus of the type typically mounted in a fixed path over which objects are pushed or pulled, the purpose of the apparatus being to reduce the force needed to slide the objects over the path.

SUMMARY OF THE INVENTION

As broadly disclosed and claimed, the two-lobed conveyor ball of this invention comprises a hub having a hole therethrough adapted to receive a first axle, second and third axles coaxially mounted on the hub at right angled to the axis of the hole therein and on opposite sides thereof, first and second generally hemispherical lobes rotatably mounted on the second and third axles respectively, and a spacer disc mounted on the hub, extending between the second and third generally hemispherical lobes, and filling the gap therebetween at the outer surface thereof, thereby preventing objects or material being passed over the conveyor ball during use thereof from getting caught between the first and second generally hemispherical lobes.

BRIEF DESCRIPTION OF THE DRAWINGS

FIG. 1 shows a transfer station on a conveyor line, the conveyor line employing conventional conveyor rollers and the transfer station employing two-lobed conveyor balls according to this invention.

FIG. 2 shows a two-lobed conveyor ball according to this invention mounted in a typical support frame adapted to mount a plurality of such conveyor balls in linear array.

FIG. 3 shows a two-lobed conveyor ball according to this invention mounted in a modular mounting.

FIG. 4 shows a two-lobed conveyor ball according to this invention in a partially broken away cross-section taken through the center of the conveyor ball.

FIG. 5 is a plan view of an integrally formed subassembly comprising the lobe axles, the spacer disc, and the hub.

DETAILED DESCRIPTION OF A PREFERRED EMBODIMENT

FIG. 1 shows a plurality of two-lobed conveyor balls 10 according to this invention mounted in a transfer station 12 between two conveyor lines 14 and 16. The conveyor lines 14 and 16 comprise conventional conveyor rollers 18, which may be powered or free-turning as desired. Objects moving on to the transfer station 12 from either conveyor line 14 or conveyor line 16 may be freely slid in any direction once positioned on the transfer station 12, as indicated by the crossed arrows in the middle of FIG. 1. This is so because, as will be described in detail hereinafter, the lobes will rotate about two independent, orthogonal axes permitting the surface of each lobe to rotate with objects being passed over the conveyor balls unless the contact vector happens to be in the place defined by the central axle and the lobe axles. That is obviously quite unlikely to occur, but, even if it does occur for one conveyor ball, use of a plurality of such conveyor balls, as shown in FIG. 1, insures that numerous other conveyor balls will be in rotatable positions, minimizing the effect of one conveyor ball's not being in such a position. Moreover, the random angles at which subsequent objects strike the momentarily "hung up" conveyor ball, plus the different angles at which they are moved over the transfer station 12, insure that the momentarily hung up conveyor ball is quickly moved into a rotatable position.

It should be understood that, while FIG. 1 shows a transfer station composed entirely of non-powered conveyor balls according to this invention, the linear arrays of non-powered conveyor balls can be interspersed with powered transfer means, such as those disclosed in commonly assigned U.S. Pat. No. 3,804,230.

Figure 7:
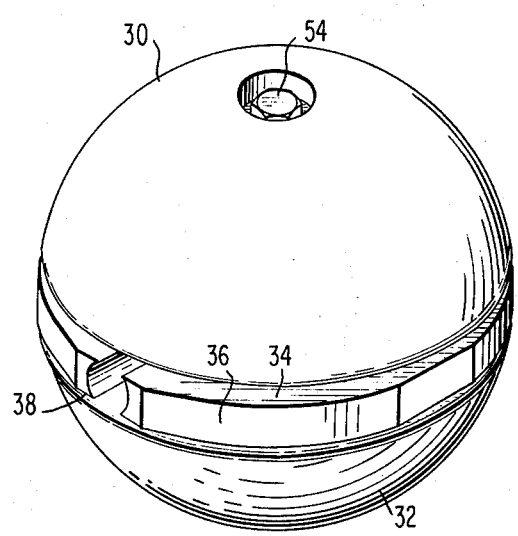
FIG. 7 is a perspective view of a two-lobed conveyor ball according to this invention.

The structure of the two-lobed conveyor ball according to this invention may be understood from FIG. 4. As shown therein, the conveyor ball comprises a hub 20 having a hole 22 therethrough adapted to receive a first axle 24 (shown in FIGS. 2 and 3), second and third axles 26 and 28 which are coaxially mounted on the hub 20 at right angles to the axis thereof and on opposite sides thereof, first and second generally hemispherical lobes 30 and 32 which are rotatably mounted on the second and third axles 26 and 28, respectively, and a spacer disc 34 (better seen in FIG. 7) which is mounted on the hub 20, extends between the lobes 30 and 32, and fills the gap between the outer surfaces of the lobes 30 and 32, thereby preventing objects or material being passed over the conveyor ball during use thereof from getting caught between the lobes 30 and 32.

Figure 6:
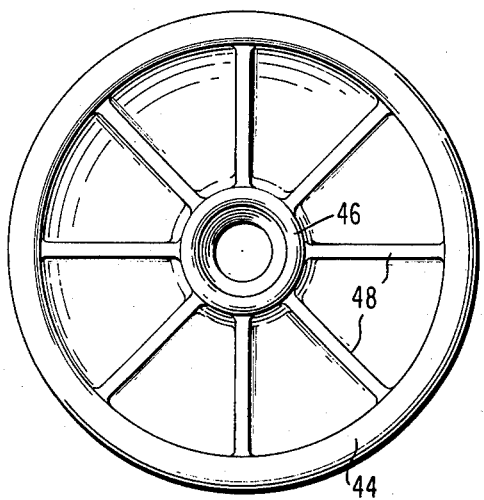
FIG. 6 is a view into the inside of one of the lobes.

As may be seen in FIG. 5, the spacer disc 34 is generally circular in plan view, corresponding to the circular inner faces (one of which is seen in FIG. 6) of the two lobes between which it is sandwiched. However, it is not perfectly circular. On the one hand, the outer surface 36 of the spacer disc 34 remote from the hub 20 is slightly recessed beneath the adjacent surfaces of the lobes 30 and 32 so that articles being passed over the conveyor ball will ordinarily not come in contact with the spacer disc 34 — although of course it does come into contact with loose hanging cords, wires, etc., which otherwise might get caught between the lobes 30 and 32. On the other hand, the outer surface 38 of the spacer disc 34 which, when the conveyor ball is mounted on an axle 24 as shown in FIGS. 2 and 3, is adjacent to the axle 24, extends slightly beyond the adjacent surfaces of the lobes 30 and 32 so that the surface 38, not the adjacent surface of the lobes 30 and 32, contacts the support assembly 40 (FIG. 2) or 42 (FIG. 3) if the conveyor ball moves axially on the axle 24 enough to come into contact with the support assembly. (Of course, alternatively means may be provided on the axle 24 to fix the axial position of the conveyor ball; in that case, the spacer disc can be recessed all the way around.)

The axles 26 and 28, the spacer disc 34, and the hub 20 are preferably formed integrally, as shown in FIG. 5. Moreover, they are preferably formed of a plastic material having a low coefficient of friction, since the lobes 30 and 32 rotate on the axles 26 and 28, respectively, and the axle 24 preferably rotates in the hole 22, which extends through the spacer disc 34 as well as the hub 20, as may best be seen in FIG. 8.

As previously stated, the axle 24 preferably rotates in the hole 22, and, to facilitate such rotation, the surface of the hole 22 constitutes a bearing adapted to permit the axle 24 to rotate therewithin. Alternatively, the axle 24 may be press fit into the hub 20 and the spacer disc 34, in which case the bearing surface for rotation about the axis of the axle 24 is located in the support assembly 40 or 42.

The lobes 30 and 32 may be solid, but they need not be. As shown in FIGS. 4 and 6, in the preferred embodiment of this invention each of the lobes 30 and 32 comprises a generally hemispherical wall 44 having a thickness much less than the radius thereof, a centrally and radially mounted bearing 46 depending from the inner surface of the wall 44, and a plurality of reinforcing webs 48 extending radially from the outer surface of the bearing 46 to the inner surface of the wall 44. As shown in FIG. 4, each bearing 46 is shaped to receive the associated one of the axles 26 and 28, and each reinforcing web 48 is cut away to clear the hub 20, which does not extend to the inner surface of the walls 44 in order to permit the reinforcing webs 48 to do so right down to the inner face of the walls 44.

The lobes 30 and 32, which come into direct contact with objects being slid over the conveyor ball, are also preferably formed of a plastic material having a high surface toughness. On the other hand, the bearings 46, which are preferably formed integrally with the lobe walls 44 must rotate easily on the axles 26 and 28, so the lobes 30 and 32 are preferably formed of a plastic material having a low coefficient of friction. One plastic material which fulfills both of these conditions is that sold under the trademark ACETAL.

Figure 8:
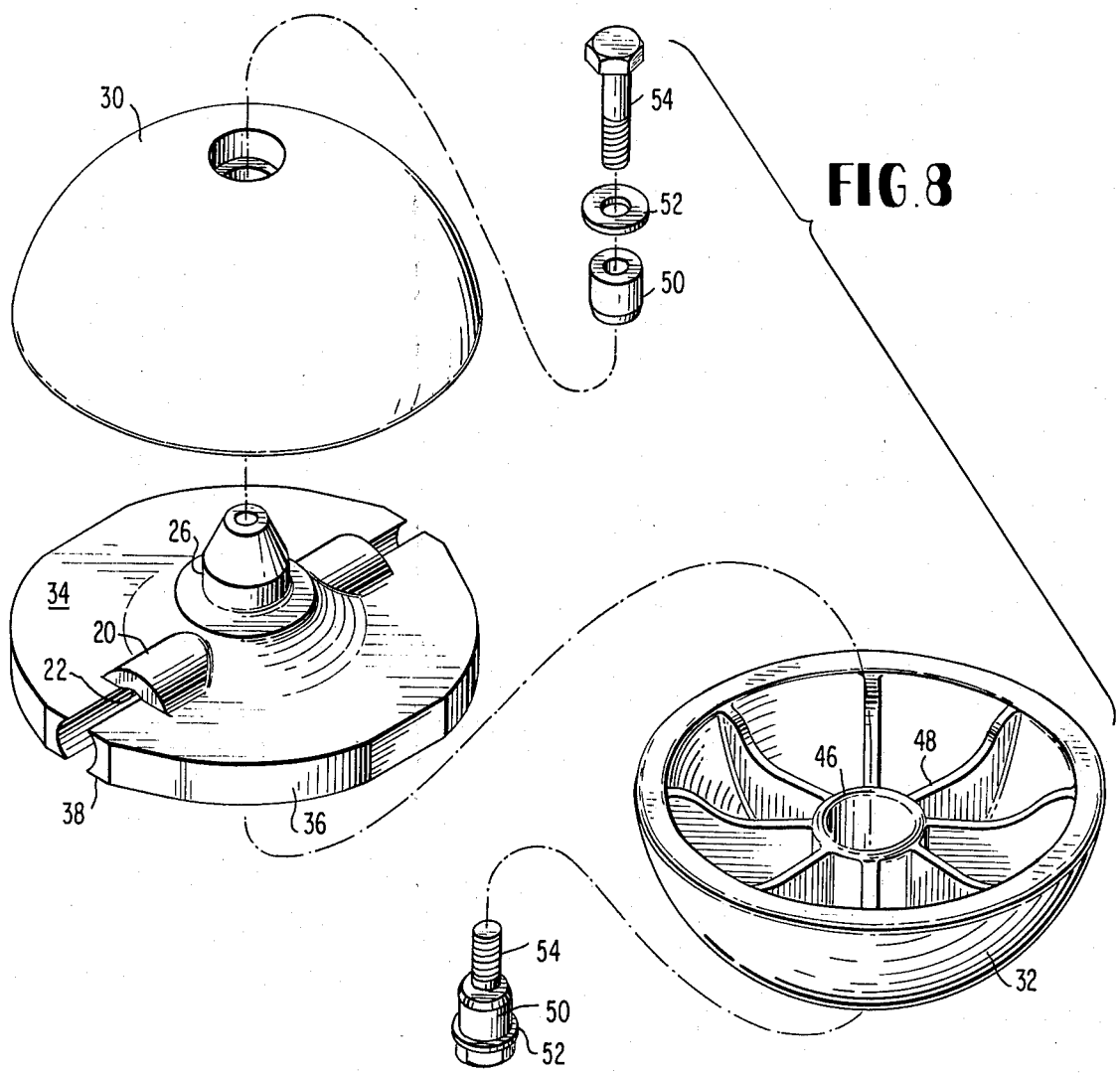
FIG. 8 is an exploded perspective view of the parts of a two-lobed conveyor ball according to this invention.

FIG. 8, which is an exploded perspective view of the parts of a conveyor ball according to this invention, indicates how such a conveyor ball may be assembled. While the lobes 30 and 31 could, of course, be mounted on the axles 26 and 28 without a break in the surface of the lobes (as the lobes are mounted in related abandoned application Ser. No. 565,909, filed Apr. 7, 1975, they are conveniently mounted on the axles 26 and 28 by means of bearings 50, washers 52, and self-tapping plastite screws 54.

OPERATION OF THE PREFERRED EMBODIMENT

The surface of a conveyor ball according to this invention will rotate about two independent, orthogonal axles — namely, the axis defined by the hole 22 and the axis deferred by the axles 26 and 28. Accordingly, objects being slid over the conveyor ball will cause the surface of the conveyor ball to rotate along with them unless the contact vector happens to be in the plane defined by the two axes — i.e., with reference to FIGS. 2 3, in the plane of the paper. If the contact vector is at any angle to the plane of the paper, the surface of the conveyor ball will rotate with the object contacting the conveyor ball. Accordingly, the friction encountered by the object is essentially that of the bearing surfaces within the conveyor ball, permitting the object to be moved over the conveyor ball with relatively little effort. In the unlikely event that the contact vector does happen to fall in the plane defined by the two axes (or, in practice, in a plane close enough to that so that the component of the contact vector outside that plane is insufficient to rotate the conveyor ball), the conveyor ball is easily and automatically knocked off this position of unstable equilibrium by subsequent use of the device.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment. For instance, the second and third axles could be mounted on the first and second lobes, and the hub could comprise bearing means to receive the second and third axles.

What is claimed is:
1. A two-lobed conveyor ball comprising:
   a. a hub having a hole therethrough which defines a first axis and which is adapted to receive a first axle;
   b. second and third axles coaxially mounted on said hub at right angles to the first axis and on opposite sides thereof;
   c. first and second generally hemispherical lobes rotatably mounted on said second and third axles respectively, said first and second generally hemispherical lobes each comprising:
      i. a generally hemispherical wall having a thickness much less than the radius thereof;
      ii. a centrally and radially mounted bearing depending from the inner surface of said generally hemispherical wall, said bearing being shaped to receive the associated one of said second and third axles; and
      iii. a plurality of reinforcing webs extending radially from the outer surface of said bearing to the inner surface of said generally hemispherical wall; and
   d. a spacer disc mounted on said hub, extending between said first and second generally hemispherical lobes, and filling the gap therebetween at the outer surface thereof, thereby preventing objects or material being passed over the conveyor ball during use thereof from getting caught between said first and second generally hemispherical lobes.

2. A two-lobed conveyor ball as recited in claim 1 wherein the outer surface of said spacer disc remote from said hub is slightly recessed beneath the adjacent surfaces of said first and second generally hemispherical lobes.

3. A two-lobed conveyor ball as recited in claim 2 wherein the outer surface of said spacer disc adjacent to said hub extends slightly beyond the adjacent surfaces of said first and second generally hemispherical lobes.

4. A two-lobed conveyor ball as recited in claim 1 wherein the outer surface of said spacer disc adjacent to said hub extends slightly beyond the adjacent surfaces of said first and second generally hemispherical lobes.

5. A two-lobed conveyor ball as recited in claim 1 wherein said second and third axles, said spacer disc, and said hub are formed integrally.

6. A two-lobed conveyor ball as recited in claim 5 wherein said second and third axles, said spacer disc, and said hub are all formed of a plastic material having a low coefficient of friction.

7. A two-lobed conveyor ball as recited in claim 5 wherein the surface of the hole through said hub constitutes a bearing adapted to permit the first axle to rotate therewithin.

8. A two-lobed conveyor ball as recited in claim 1 wherein said second and third axles, said spacer disc, and said hub are all formed of a plastic material having a low coefficient of friction.

9. A two-lobed conveyor ball as recited in claim 1 wherein the surface of the hole through said hub constitutes a bearing adapted to permit the first axle to rotate therewithin.

10. A two-lobed conveyor ball as recited in claim 1 wherein said first and second generally hemispherical lobes are each formed of a plastic material having a low coefficient of friction.

11. A two-lobed conveyor ball as recited in claim 1 wherein said first and second generally hemispherical lobes are each formed of a plastic material having a low coefficient of friction.

12. A two-lobed conveyor ball as recited in claim 1 wherein said first and second generally hemispherical lobes are each formed of a plastic material having a high surface toughness.

13. A two-lobed conveyor ball as recited in claim 1 wherein said first and second generally hemispherical lobes are each formed of a plastic material having a high surface toughness.

14. A two-lobed conveyor ball comprising:
a. a hub having a hole therethrough which defines a first axis and which is adapted to receive a first axle;
b. first and second generally hemispherical lobes each of which comprises a generally hemispherical wall having a thickness much less than the radius thereof;
c. means for rotatably mounting said first and second lobes on said hub for rotation about second and third axes which are coaxial, at right angles to the first axis, and on opposite sides of the first axis;
d. a plurality of reinforcing webs extending radially from the outer surface of said means to the inner surface of said generally hemispherical wall; and
e. a spacer disc mounted on said hub, extending between said first and second generally hemispherical lobes, and filling the gap therebetween at the outer surface thereof, thereby preventing objects or material being passed over the conveyor ball during use thereof from getting caught between said first and second lobes.

15. A two-lobed conveyor ball as recited in claim 14 wherein the outer surface of said spacer disc remote from said hub is slightly recessed beneath the adjacent surfaces of said first and second generally hemispherical lobes.

16. A two-lobed conveyor ball as recited in claim 15 wherein the outer surface of said spaced disc adjacent to said hub extends slightly beyond the adjacent surfaces of said first and second generally hemispherical lobes.

17. A two-lobed conveyor ball as recited in claim 14 wherein the outer surface of said spacer disc adjacent to said hub extends slightly beyond the adjacent surfaces of said first and second generally hemispherical lobes.

18. A two-lobed conveyor ball as recited in claim 14 wherein said spacer disc and said hub are formed integrally.

19. A two-lobed conveyor ball as recited in claim 18 wherein said spacer disc and said hub are both formed of a plastic material having a low coefficient of friction.

20. A two-lobed conveyor ball as recited in claim 18 wherein the surface of the hole through said hub constitutes a bearing adapted to permit the first axle to rotate therewithin.

21. A two-lobed conveyor ball as recited in claim 14 wherein said spacer disc and said hub are both formed of a plastic material having a low coefficient of friction.

22. A two-lobed conveyor ball as recited in claim 14 wherein the surface of the hole through said hub constitutes a bearing adapted to permit the first axle to rotate therewithin.

23. A two-lobed conveyor ball as recited in claim 14 wherein said first and second generally hemispherical lobes are each formed of a plastic material having a low coefficient of friction.

24. A two-lobed conveyor ball as recited in claim 14 wherein said first and second generally hemispherical lobes are each formed of a plastic material having a low coefficient of friction.

25. A two-lobed conveyor ball as recited in claim 14 wherein said first and second generally hemispherical lobes are each formed of a plastic material having a high surface toughness.

26. A two-lobed conveyor ball as recited in claim 14 wherein said first and second generally hemispherical lobes are each formed of a plastic material having a high surface toughness.

* * * * *

UNITED STATES PATENT AND TRADEMARK OFFICE
CERTIFICATE OF CORRECTION

PATENT NO. : 3,976,177
DATED : August 24, 1976
INVENTOR(S) : Elwood B. Brown

It is certified that error appears in the above-identified patent and that said Letters Patent are hereby corrected as shown below:

Claim 10, line 1, change "1" to --8--.

Claim 12, line 1, change "1" to --8--.

Claim 23, line 1, change "14" to --21--.

Claim 25, line 1, change "14" to --21--.

Signed and Sealed this

Ninth Day of November 1976

[SEAL]

Attest:

RUTH C. MASON
*Attesting Officer*

C. MARSHALL DANN
*Commissioner of Patents and Trademarks*